US006950211B2

(12) United States Patent
Trifonov et al.

(10) Patent No.: US 6,950,211 B2
(45) Date of Patent: Sep. 27, 2005

(54) FINE MOIRE CORRECTION IN IMAGES

(75) Inventors: Mikhail Ivanovich Trifonov, Leningrad Region (RU); Kryzstof Antoni Zaklika, Saint Paul, MN (US); Pavel Vladimirovich Gruzdev, Saint Petersburg (RU)

(73) Assignee: Corel Corporation, Ottawa (CA)

( * ) Notice: Subject to any disclaimer, the term of this patent is extended or adjusted under 35 U.S.C. 154(b) by 902 days.

(21) Appl. No.: 09/899,503

(22) Filed: Jul. 5, 2001

(65) Prior Publication Data

US 2003/0007699 A1 Jan. 9, 2003

(51) Int. Cl.$^7$ .............................................. G06K 15/00
(52) U.S. Cl. ...................... 358/3.26; 358/518; 358/463; 382/252
(58) Field of Search ............................. 358/3.03, 3.26, 358/518, 537, 443, 447, 448, 463; 382/167, 252

(56) References Cited

U.S. PATENT DOCUMENTS

| 2,407,211 A | 9/1946 | Yule | 95/5 |
|---|---|---|---|
| 2,420,636 A | 5/1947 | Yule | 95/5 |
| 2,455,849 A | 12/1948 | Yule | 95/5 |

(Continued)

FOREIGN PATENT DOCUMENTS

| EP | 0404398 | * 12/1990 | ............ G09G/5/02 |
|---|---|---|---|
| EP | 1 022 912 A2 | 7/2000 | ............ H04N/9/04 |
| JP | 10/276331 | 10/1981 | ........... H04N/1/409 |
| JP | 51/45757 | 6/1993 | ............ H04N/1/40 |
| JP | 1972/95961 | 11/1995 | ........... G06F/17/10 |
| JP | 8/149358 | 6/1996 | ........... H04N/5/232 |
| JP | 10/003539 | 1/1998 | ............ G06T/5/20 |
| JP | 11/275367 | 10/1999 | ........... H04N/1/409 |
| JP | 2000/023085 | 1/2000 | ............ H04N/5/91 |
| JP | 2001-235371 | * 8/2001 | ............ G01J/3/50 |
| JP | 2003044848 | * 2/2003 | ............ H04N/1/46 |
| JP | 2004069403 | * 3/2004 | ........... G09B/23/30 |
| WO | WO 98/36555 | 8/1998 | ............ H04N/1/04 |

OTHER PUBLICATIONS

B. R. Frieden, "A New Restoring Algorithm for the Preferential Enhancement of Edge Gradients," *J. Opt. Soc. Am.*, vol. 66(3), Mar. 1976; 280–283.

S. R. Amtey, et al., "Applications of Digital Processing in Computed Radiography," *SPIE*, vol. 207, 1979; 210–212.

C. R. Wilson, et al., "Low Frequency of Digital Radiographic Images," *SPIE*, vol. 314, 1981; 327–330.

E. Alparslan, et al., "Image Enhancement by Local Histogram Stretching," *IEEE*, vol. SMC–11(5), May 1981; 376–385.

(Continued)

*Primary Examiner*—Jerome Grant, II
(74) *Attorney, Agent, or Firm*—Henslay Kim & Edgington, LLC

(57) ABSTRACT

A method of noise removal from a digital image, especially moiré noise, comprising providing a three-dimensional representation of a at least one image color channel as a surface over the plane of the image, creating a virtual surface patch, placing the surface patch against topography in the three-dimensional surface mapping of the image so that the virtual surface patch intersects topography of the three-dimensional surface with respect to at least some pixels of the image surface region, adjusting the height, tilt and curvature of the surface patch with respect the image surface in order to optimally represent the surface, then estimating a palliative value for the image surface for at least one pixel within the area of the surface patch from the adjustment of the surface patch, and replacing the value of the at least one pixel in the at least one image color channel with the palliative value.

18 Claims, 4 Drawing Sheets

U.S. PATENT DOCUMENTS

| | | | |
|---|---|---|---|
| 3,011,395 A | 12/1961 | Flose | 88/24 |
| 3,615,433 A | 10/1971 | Biemson et al. | 96/27 |
| 4,237,481 A | 12/1980 | Aughton | 358/80 |
| 4,315,318 A | 2/1982 | Kato et al. | 364/515 |
| 4,317,179 A | 2/1982 | Kato et al. | 364/515 |
| 4,334,244 A | 6/1982 | Chan et al. | 358/166 |
| 4,336,558 A | 6/1982 | Lew | 358/285 |
| 4,346,409 A | 8/1982 | Ishida et al. | 358/280 |
| 4,571,635 A | 2/1986 | Mahmoodi et al. | 358/284 |
| 4,907,096 A | 3/1990 | Stansfield et al. | 358/456 |
| 4,926,267 A | 5/1990 | Shu et al. | 358/454 |
| 4,965,599 A | 10/1990 | Roddy et al. | 346/160 |
| 4,987,496 A | 1/1991 | Greivenkamp, Jr. | 358/448 |
| 5,107,188 A | 4/1992 | Rindal | 315/370 |
| 5,121,213 A | 6/1992 | Nishioka | 358/213.11 |
| 5,166,810 A | 11/1992 | Sorimachi et al. | 358/462 |
| 5,225,915 A | 7/1993 | Ciccone et al. | 358/454 |
| 5,239,390 A | 8/1993 | Tai | 358/458 |
| 5,253,046 A | 10/1993 | Shiraishi | 358/43 |
| 5,351,312 A | 9/1994 | Sato et al. | 382/50 |
| 5,408,337 A | 4/1995 | Kanda | 358/447 |
| 5,533,149 A | 7/1996 | Kaplan et al. | 382/260 |
| 5,563,963 A | 10/1996 | Kaplan et al. | 382/266 |
| 5,649,031 A | 7/1997 | Nakamura et al. | 382/254 |
| 5,798,846 A | 8/1998 | Tretter | 358/456 |
| 5,821,915 A | 10/1998 | Graham et al. | 345/138 |
| 6,094,018 A | 7/2000 | Fujimori et al. | 315/370 |
| 6,100,929 A | 8/2000 | Ikeda et al. | 348/262 |
| 2003/0007699 A1 * | 1/2003 | Trifonov et al. | 382/275 |
| 2004/0170316 A1 * | 9/2004 | Saquib et al. | 382/162 |

OTHER PUBLICATIONS

J. Shou–Pyng Shu, et al., "Moiré Factors and Visibility in Scanned and Printed Halftone," *Optical Engineering*, vol. 28(7), Jul. 1989; 805–812.

N. Ohyama, et al., "Suppression of Moiré Fringes Due to Sampling of Halftone Screened Images," *Optics Communications*, vol. 60(6), Dec. 15, 1986; 364–368.

J. Ching–Yu Yang, et al., "Suppression of Moiré Patterns in Scanned Haltone Images by Double Scans with Grid Movements," *Pattern Recognition Letters*, vol. 18. 1997;213–227.

K. Krause, "Tip 10: Litter Removal: Moiré Removal," http://www.pixelfoundry.com/Tips/.;1–6.

X. Liu, et al, "Analysis of Moiré Patterns in Non–uniformly Sampled Halftones," *Image and Vision Computing*, vol. 18, 2000; 843–848.

D. P. Panda, et al., "Recursive Least Squares Smoothing of Noise in Images," *IEEE*, vol. ASSP–25(6), Dec. 1977; 520–524.

* cited by examiner

FINE MOIRE CORRECTION IN IMAGES

BACKGROUND OF THE INVENTION

1. Field of the Invention

The present invention relates to image data, particularly image data that is provided as an image file, and particularly image data that generates an image and may contain moiré patterns, particularly color images that display moiré patterns in virtual or real images.

2. Background of the Art

Recorded images comprise a spatial, normally planar, representation of either spatially or temporally variable original signals. A large proportion of such recordings, such as copies of documents and pictures, represent a one-to-one relationship with an original document or scene, frequently with magnification or reduction involved. Radiographic film images in medicine represent a class of images where the original is not visible to the human eye and must be formed by a combination of invisible radiation (e.g., x-rays) and a suitable transducer (fluorescent screen).

In all image forming systems, degradation of the original information occurs which normally manifests itself in at least three forms: (1) blurring of edges (reduced resolution, lower sharpness); (2) random irregularities (noise, fog); and (3) image format artifacts (e.g., smudging, spreading, moiré patterns, blocking and trapping). In normal photographic images, it has long been known that edge sharpness can be enhanced and noise reduced by masking the original with a negative unsharp mask of suitable contrast (usually with lower contrast than that of the original). Early work by J. A. C. Yule is representative of this photographic masking approach (U.S. Pat. Nos. 2,407,211, 2,420,636, 2,455,849) and more complex approaches are represented by Blearson et al. in U.S. Pat. No. 3,615,433. An early attempt to use a raster scanning of the image while measuring the instantaneous light values photoelectrically and attenuating the beam according to a predetermined relationship with the light value is disclosed by Folse in U.S. Pat. No. 3,011,395. The rapid development of the Space Program lead to the emergence of high efficiency digital means of analyzing, reconstituting and enhancing images. Median filtering as a means of enhancing edge contrast has also been studied (e.g., B. R. Frieden JOSA 66. 280–283 (1976)). In the medical radiography field this stimulated the development of computerized tomography and the digital processing of radiographs in general (S. R. Amety et al, SPIE 207, 210–211 (1979), and C. R. Wilson et al, SPIE 314, 327–330 (1981)). In these approaches the image has been divided into a large number of "pixels" by scanning. A moving window consisting of nxm pixels centered on pixel i with image value $D_i$ is investigated by an on line computer as pixels i are scanned. The arithmetic average D of the pixels within the window is then used to modify the central pixel value $D_i$ to a filtered value $D'_i$ by the algorithm:

$$D'_i = aD_i - bD$$

The parameters a and b are chosen to give specific image characteristics but are constant over the scan of a single image.

The concept of varying parameters similar to a and b throughout the scan of the image based on certain local properties of the image has been studied and these patents (H. Kato et al U.S. Pat. Nos. 4,315,318 and 4,317,179 and M. Ishida et al U.S. Pat. No. 4,346,409) have disclosed particular relationships between the parameters and the values of $D_i$ or D which can give further image enhancement. These techniques do not however distinguish between noise and image edges as far as enhancement is concerned, and the higher the density $D_i$ or D the greater the enhancement.

In other imaging technology areas, similar approaches have been made. Thus in E. Alparslau and F. Ince, IEEE Vol SMC-11, 376–384 (1981), images are treated with an edge enhancement algorithm based in part on an adaptive parameter based on the difference between the maximum and minimum pixel values in the window at any point. In U.S. Pat. No. 4,237,481 final image data for printing plate production is treated by electronic circuits according to algorithms that combine sharp and unsharp image data with pixel parameters. U.S. Pat. No. 4,334,244 treats video signal images electronically according to algorithms based on the fixed average and wherein values acting on the instantaneous gradient of the image signal, the degree of edge enhancement being partly controlled by the dynamic noise of the system.

U.S. Pat. No. 4,571,635 describes a method of displaying or recording an image showing enhanced detail (particularly edge detail) relative to an original image or record comprising:

(a) making a point by point record of the original image by scanning it in a manner to select successive pixels in a logical array, (b) storing the pixel values in such a way and for such a period that a window comprising a sub-array of adjacent pixels can be selected and analyzed statistically, said window comprising between 5 and 225 pixels, (c) analyzing the pixel values of the window surrounding each pixel in turn to give the average value D and the standard deviation sigma, (d) processing the central fixed value $D_c$ to give an improved value $D'_c$ such that $$D'_c = kD_c + (1-k)D$$

wherein k is a variable having a value between 0 and 0.99 which varies from pixel to pixel based on the value of sigma, said value of k being related monotonically to sigma in such a way as to have an upper and lower bound within the said range 0 to 0.99, and (e) displaying or recording the enhanced image based on the derived values $D_c'$. In effect, the process averages optical density values, establishes a trend adjacent an edge, and then adjusts the density of individual pixels to continue the established trend.

Each of these references relates to image correction of edge defects through the use of software embodying algorithms that assist in the visual correction of the specifically identified region of defects, edges in the image. However, there arises a problem in reading an original image such as a photograph or a painting having thick portions and thin portions provided as a dot image by a half tone etching method. More specifically, because of the relation between the pitch between each of the dots and the reading pitch by the image pickup device, or of a subtle deviation of phase based on the period and the like in half tone processing, a periodical pattern of thick and thin portions called moiré pattern is generated, providing trouble in viewing.

Moiré patterns result from the interaction of the spatial frequencies of at least two spatially extended periodic patterns when they are superimposed. The visual effect varies widely depending on the relative angular orientation, translation and frequency distribution in two the patterns. In some cases moiré can lead to pleasing design effects but in most situations in graphic arts moiré is to be avoided. Examples of undesirable moiré patterns are those formed in computer monitors or by overlap of color separations in color printing. One area in which moiré is a particular problem is in digital imaging, where images are formed as regular grids of picture elements or pixels. Such grids are associated with particular spatial frequencies that can interact with other spatial frequencies of components present in devices that are part of the imaging chain. A commonly encountered situation involves the scanning of colored halftone printed media, such as those composed of regularly spaced dots of colored ink of varying size. Typically, the scanner contains a detector such as a CCD (Charge Coupled Device) array and the spacing of the array interacts with the spacing of ink dots to produce an undesirable moiré pattern in the scanned image.

The occurrence of such moiré patterns is well known in digital imaging. One commonly found form of moiré is of high spatial frequency in which the separation between elements of the moiré pattern is comparable to the size of the smallest details in the image. It is common to remove this type of moiré pattern with some form of smoothing or blurring. In this procedure a compromise is made between elimination of the moiré pattern and the loss of authentic fine detail in the image. There have been attempts to eliminate the moiré in the scanner itself by optical blurring, as described in U.S. Pat. Nos. 5,159,469, 5,121,213, 4,987,496 European Patent 1,022,912 or Japanese Patent 8/149,358, or by adding noise or jitter to the scanning process, as described in U.S. Pat. No. 4,336,558 or Japanese Patent 51/45,757. Other attempts include matching the scanning frequency to spatial frequency elements in the material to be scanned as disclosed in U.S. Pat. Nos. 5,253,046, 4,965,599 or European Patent 960,523 or in Shu, J. S. -P., Springer, R. and Yeh, C. L., *Optical Engineering*, v.28(7), 805–12 (1989). There have also been efforts to combine multiple scans of the same subject in order to reduce moiré as is disclosed in U.S. Pat. No. 6,100,929, Ohyama, N., Yamaguchi, M., Tsujiuchi, J., Honda, T. and Hiratsuka, S., *Optics Communications*, v.60(6), 364–8 (1986) or Yang, C. -Y. and Tsai, W. -H., *Pattern Recognition Letters*, v.18(3), 213–27 (1997). Actions performed mechanically or electrically within the scanner can also be accomplished by digital computation. Thus, for example, U.S. Pat. No. 5,225,915 teaches the enhancement of image noise in order to mask moiré patterns. Scanners have been designed including computational means for blurring noise. For example, Japanese Pat. Wei 10/276,331 discloses an averaging circuit, Japanese Pat. Wei 11/275,367 the use of a moving average and U.S. Pat. No. 5,821,915 the use of a weighted average filter, while Japanese Patent [2,000/023,085] teaches the use of a median filter for moiré suppression in a digital camera. Further, U.S. Pat. No. 5,239,390 teaches a descreening method using an iterative smoothing filter tuned to the frequency of the halftone screen, while U.S. Pat. No. 5,166,810 discloses the removal of halftone mesh patterns by a combination of a smoothing filter and edge emphasis, and U.S. Pat. No. 4,907,096 claims descreening by filtering in the Fourier (or spatial frequency) domain. In addition to such low-pass filtering methods, there have been attempts to blur the image using specially shaped or directional filters. Thus, Japanese Pat. 1972/95,961 describes a 2D filter with an axially symmetric impulse response, Japanese Wei Patent 10/003,539 discloses smoothing in the direction of minimum brightness variation, U.S. Pat. No. 5,351,312 teaches a spatial filter with positive coefficients in the main scan and cross-scan directions with negative coefficients in the diagonal directions, U.S. Pat. No. 5,649,031 claims a smoothing filter with maximum smoothing in a direction slanted with respect to the scan direction, and U.S. Pat. No. 5,798,846 discusses the use of modified median filter with a specially shaped (e.g., cross-shaped) filter window.

Another variant of moiré defect occurs as widely spaced color bands or blotches when colored halftone images are scanned. The spacing between these bands is very much larger than the scale of the finest authentic details in the image. Thus, approaches for removing moiré using blurring are completely unsuitable for removing this type of defect since blurring sufficient to reduce the bands will completely destroy small, and often medium scale, detail in the image. This moiré color banding is not unusual in scans produced by consumer scanners and there is a need for a method to eliminate it. No generally applicable and straightforward methods exist for achieving this objective. One method has been described by Kai Krause, originally in an electronic Compuserve Forum, and now available on the world wide web at http://www.pixelfoundry.com/Tips/ under the title "Tip 10: Litter Removal: Moiré Removal". This article teaches a method of removal of fine moiré patterns using Gaussian blurring. Additionally, it discloses an approach for reducing color bands. This latter method relies on splitting the image into color channels such as red, green and blue and editing a look-up table that transforms each of these colors. The principle involves manually examining each of the bands for the range of color intensities present in a given channel and then manually editing a linear look-up table in such a way that this range of input intensities becomes equal to a single average intensity after color transformation using this table. This approach does not admit automation and requires that there must first be available a method of editing look-up tables, something not normally found in consumer software. In practice it is very difficult to accomplish the disclosed correction in a way that leaves the edges of bands looking natural and blended with the image. If the color bands are not contained in a single color channel, multiple channels must be edited in the way described. This is the situation in the common case of skin tones, which can be accompanied by yellow banding, and would therefore require at least the red and green channels to be edited. Another disadvantage of this method of band elimination is that, while the alteration may lead to reduction in banding, it also influences the same color channel in regions of the image where there is no banding. This introduces new defects. To cope with this problem, it is necessary to select separate regions of the image and correct these regions individually. A further disadvantage of this approach is that it reduces the total number of colors in the image. In summary, the success of the published procedure depends very much on the specific image content, requires great skill and familiarity with image processing concepts, must be accomplished by time-consuming region-by-region correction of the image, and cannot be automated. There remains, therefore, a need for a simple process for removing moiré-related color bands that can operate rapidly on a complete image. The current widespread availability of inexpensive consumer scanners exacerbates this need.

The line screen that determines the ink dot spacing in halftone printing varies with the print medium. It can, for example, be about 80 lines per inch for newspapers, about 133 or 150 lines per inch for magazines and books, and as high as about 200 lines per inch or more for high quality art reproduction, posing a wide variation in halftone spatial frequencies. At the same time scanners and their hardware components differ widely. In some examples of consumer scanners (as noted in X. Liu and R. Erich, *Image Vis. Comput.*, v.18(10), 843–8 (2000)) non-uniform resampling of the image in the scanner introduces extra aliasing components and complicates the moiré pattern. It can be expected that combinations of different printed media with different scanner hardware will produce widely differing moiré patterns of the color band type. It is, therefore, surprising that the present invention can, in a simple way, reduce such moiré color bands in a broad variety of images from such sources.

A method has been proposed to prevent the generation of the moiré pattern, in which dimension or pattern of a dither matrix is changed in half tone processing. However, the moiré pattern cannot be eliminated by this method when the reading pitch (the pitch between pixels in the image pickup device) itself is the cause of the moiré pattern.

Under another method, the moiré pattern has been eliminated by arranging a filter for eliminating the moiré pattern in a light path in reading the original image and by gradation of the image by dispersing the image focused on one pixel of the image pickup device onto adjacent pixels. However, the moiré pattern cannot be eliminated in all of the images having thick portions and thin portions even by this method when a plurality of images with thick portions and thin portions having different dot pitches are included in the original image.

In image forming apparatus, such as copy machines, an image is read by an image-reading unit as a digital signal, and the digital signal is supplied to a recording unit so as to obtain a reproduced image on a hard copy. In such an image-reading unit, an original is read out by an image sensor such as a CCD (Charge Coupled Device) image sensor by dividing the image into small areas, that is, pixels. An analog electric signal obtained by the image sensor is converted into a digital signal, and then various image-processing operations are applied to the digital signal so as to obtain optimum image data in accordance with the image characteristics thereof. In this type of image forming apparatus, an original is read out by a line sensor or the like having a small pixel size. Accordingly, when intensity change of the original image has periodicity such as in a half tone image, there is a possibility of formation of moiré in a recorded image due to interference of the periodicity of the intensity change of the original image with the pitch of the image sensor arranged in the line sensor, that is, the sampling period. This moiré can be eliminated by suppressing the periodicity of the intensity change through a plurality of pixels by averaging the intensity of the pixels. However, when intensities of a plurality of pixels are averaged to eliminate a moiré, the resultant character image or continuous-tone image may be undesirably blurred. Therefore, there is a problem in that when a mesh image and a character image or a continuous-tone image are mixed in one original image, the averaging process must be applied only to the mesh image area.

The reproduction of intermediate tone in such digital copying machines is generally achieved by a dither method or a density pattern method. However, such methods have been associated with the following drawbacks: (1) if the original image is a screen-tone image such as a printed image, the copied image may show stripe patterns which do not exist in the original image; and (2) if the original image contains line-tone images or characters, the image quality may be deteriorated as the edges are broken by the dither method. The phenomenon (1) is called moiré and is induced by:

(a) a frequency phenomenon between the screen-tone original image and the input sampling; or (b) a frequency phenomenon between the screen-tone original image and the dither threshold matrix.

The phenomenon (b) becomes particularly evident when the dither threshold values are arranged in a dot concentrated pattern. In such case the reproduced image has a pseudo-screentone structure, which generates a frequency phenomenon with the screentone structure of the input image, thus creating moiré patterns.

U.S. Pat. No. 4,926,267 describes a method for use in reducing moiré patterns during reproducing a halftone original having extent along first and second directions, the original being formed from halftone dots situated along a screen direction and having a spatial frequency $f_{SCR}$ and period $P_{SCR}$ in the screen direction comprising:

providing gray level values for an array of pixels extending over the original, the pixels having a first spatial frequency $f_{SCR1}$ in said first direction and a corresponding first period $P_{SCR1}$ in said first direction;

developing a first gray level value for each pixel of the array whose gray level value equals or exceeds a threshold gray level value and developing a second gray level value for each pixel of the array whose gray level value is less than the threshold gray level value, said first and second gray level values defining a set of thresholded gray level values for said pixels;

determining from said set of thresholded gray level values adjacent pairs of pixels of the array in the first direction whose thresholded gray level values are different, each adjacent pair of pixels bordering a corresponding halftone dot;

determining from the gray level values of the pixels an edge error $e_1$ equal to $d_1/P_{SCR1}$ where $d_1$ is the approximate distance along the first direction between the center of the pixel the pair whose thresholded value is equal to said first gray level value and the closest edge of the corresponding halftone dot;

and processing said thresholded gray level values of said pixels of said array including: (a) using a processing window to define successive sub-arrays of said pixels and for each sub-array of pixels: (i) adding the edge errors $e_1$ for the determined adjacent pairs of pixels included in the sub-array to form a sum $S_1$; and (ii) for the pixels having thresholded second gray level values and being in the determined adjacent pairs of pixels, starting with the pixel of the adjacent pair of pixels having the highest edge error and continuing with further pixels of the adjacent pairs of pixels in the order of descending edge error, changing the thresholded gray level values of the pixels from said second to said first threshold gray level value until the thresholded gray level values of M pixels have been changed, where M is the closest integer to the sum $S_1$.

U.S. Pat. No. 5,408,337 describes an image processing apparatus in which a moiré pattern occurring in a half tone area can be eliminated by a suitable filter. A plurality of data blocks comprising N*N pixel data are transformed by means of a two-dimensional orthogonal transform so as to obtain an N*N matrix transformation factor block. An evaluation block is prepared which comprises N*N transformation factors each of which is the mean value of the absolute values of corresponding factors from a data block being considered and data blocks surrounding the data block to be determined. Mean values A[i] and B[i] (i=0 to L−1) of predetermined transformation factors are calculated, A[i] being mean values of factors included in a number L of first areas consecutively positioned along a diagonal line of the evaluation block, B[i] being mean values of factors included in a number L of second areas positioned adjacent to and lower in frequency to the corresponding first areas, A filter selection signal is generated which corresponds to the number i when a condition is satisfied where A[i]>B[i] and A[i]>threshold value th1. The pixel data corresponding to the evaluation block is smoothed by the selected filter.

As noted above, moiré patterns can also be generated in monitors or other cathode ray tubes. Color cathode ray tubes ("CRTs") are commonly used as visual display devices, employing up to three electrodes, typically one for each primary color: red, green, and blue. Most color CRTs use a shadow mask to selectively illuminate a matrix of each electrode's respective colored phosphors (i.e., red, green, and blue). CRTs normally will have a shadow mask placed behind a phosphor-coated screen. The shadow mask is usually a metal foil with numerous perforations which allow the electron beam sourced by a particular electrode to selectively strike its respective phosphor dot. The electron-beam is focused by magnetic lenses in the CRT neck into a small spot before the electron-beam reaches the shadow mask. The electron beam from the green cathode is partially occluded by the shadow mask such that the electron beam only strikes the corresponding green phosphor after passing through the shadow mask. The beam is typically larger than the shadow mask perforation size, so the shadow mask blocks part of the beam and casts a smaller shadow of the original beam onto the desired phosphor.

The dot pitch, or spacing, between adjacent shadow mask perforations, and their corresponding phosphor dots, must be as small as possible for the highest resolution. For mechanical and economic reasons, the dot pitch is generally limited to about 0.2 millimeters ("mm") to 0.3 mm for a typical high resolution display CRT. As the electron beam traverses the screen, the shadow mask includes a periodic illumination pattern depending on whether the beam either impinges upon a perforation, and consequently the phosphor, or strikes the metal foil of the shadow mask separating the perforations. Because the sweep rate of the electron beam is known, an equivalent frequency for the resulting sinusoid can be calculated, and is referred to as the spatial frequency of the shadow mask, $v_{spatial}$.

To increase the resolution of the display, the spot size of the incident electron beam must be made as small as possible. As the electron beam spot size is reduced and begins to approach the dimensions of the phosphor dot pitch, the amount of a particular phosphor that is actually struck by the beam is a function of how well the electron beam spot is aligned to the shadow mask aperture corresponding to the intended phosphor. Moreover, it must be noted that the electron beam spot shape is not constant as the beam traverses the CRT screen. In particular, the beam spot varies from a circular shape at small angles of deflection, e.g., near the center of the CRT screen, becoming more eccentric or ovaloid at higher angles of beam deflection, e.g., near the screen perimeter. If a video pattern of alternating on-off phosphors ("pixels") is displayed, some of the pixels will be seen to be exactly aligned with the shadow mask and therefore will have uniform phosphor brightness across the dot, whereas other phosphors will exhibit a nonuniform brightness, a consequence of misalignment between electron beam and shadow mask aperture. The repeating pattern of varyingly bright pixels also is seen to be of sinusoidal form, with a frequency $v_{spot}$ equivalent to half the pixel clock frequency, where one pixel clock cycle turns on the spot, and the next pixel clock cycle turns off the pixel. As the spot size of the electron beam is reduced while viewing the on-off pattern, a periodic visual interference pattern known as moiré is produced in each video line scanned across the CRT. The frequency $v_{Moiré}$ of the moiré interference pattern is the difference between the spatial frequency of the shadow mask $v_{spatial}$, and the frequency of the electron beam spot $v_{spot}$, or $$v_{Moiré}=v_{spatial}-v_{spot}.$$

If the two frequencies $v_{spatial}$ and $v_{spot}$ were identical and in-phase, the moiré frequency $v_{Moiré}$ would zero out. A moiré frequency of zero is the ideal case, where each phosphor has a corresponding shadow mask aperture through which the corresponding electron beam travels. From a particular standpoint, however, the spot size varies as a function of the electron beam deflection angle and focus voltage. Therefore, there may be a significant variation of electron beam spot size depending on the age of the CRT and position of the electron beam on the screen. Hence, the ideal case typically cannot practicably be realized. In fact, the closer the spatial frequency and the spot frequencies are to each other, the lower the moiré beat frequency $v_{Moiré}$ and the more visible and objectionable the moiré interference pattern becomes. In addition, because the electron beam spot size varies across the face of the CRT, the individually scanned video lines will each produce a slightly different moiré interference, and therefore the moiré pattern itself varies as a function of electron beam position.

From an operating standpoint, the moiré interference phenomenon poses a serious aesthetic problem, since the best electron beam focus and highest image resolution results in unacceptably noticeable moiré patterns if the video signal being displayed includes alternating pixel patterns, which is a common occurrence. From the prior art teachings, the moiré interference problem has been addressed in three ways. First, the shadow mask and phosphor dot pitch can be reduced, which raises the effective spatial frequency of the CRT, thereby raising the moiré beat frequency so that it is less visible. The result is that in order to reduce the moiré effect, much lower resolution images must be displayed on a CRT that is inherently capable of significantly higher resolution. Second, the electron beam can be defocused so that the spot size of the electron beam is increased, thereby decreasing the amplitude of the phosphor illumination, which in turn reduces the amplitude of the phosphor spot frequency. The lower amplitude spot sinusoid results in a decrease of the amplitude, and therefore visibility, of the resulting moiré interference. Again, significant reduction in resolution and image quality are exchanged for only moderate reduction in moiré interference. A third option is to avoid displaying video signals with alternating pixel or phosphor illumination patterns, and to simply tolerate the resultant moiré interference patterns when they occur.

U.S. Pat. No. 5,107,188 describes how visible moiré interference is eliminated by alternately shifting the phase of the horizontal sync signal or video signals such that the phase of each video line, and hence the phase of the resulting moiré interference associated with that video line, is also alternately shifted. The phase of the moiré interferences are shifted such that persistence of vision in the human eye averages oppositely phased phosphor intensity variations occurring on alternating scan lines and/or vertical fields. When viewed by a user of the CRT, optical cancellation of the moiré interference patterns results.

U.S. Pat. No. 6,094,018 describes another method of addressing moiré patterns in a display monitor. A horizontal synchronization signal having a horizontal scanning frequency is received by a first circuit. A vertical synchronization signal having a vertical scanning frequency is received by a second circuit. A moiré correction signal that is proportional to a horizontal resolution of the displayed image is generated by dividing the horizontal scanning frequency by the vertical scanning frequency.

As can be seen, the main emphasis on the reduction of moiré patterns, both in printed and monitor images has been directed towards breaking up the relative frequencies between overlying or contiguous patterns. It is desirable to find alternative methods of reducing moiré in images, particularly within software solutions.

It is well know in statistics to approximate a distribution of data by fitting a function to the data using techniques such as linear regression. Such methods are described in "Applied Regression Analysis", N. R. Draper and H. Smith, Wiley, 1981. The result of the regression fit is a mathematical function that approximates the original data but completely replaces it over its entire range. It computer imaging it is also well know to approximate 3-dimensional surfaces by, for instance, triangular patches or by splines. These techniques are mentioned in "Digital Image Processing", Kenneth R. Castleman, Prentice-Hall, 1996. A characteristic of these methods is that again the entire surface is replaced by some form of approximate surface. U.S. Pat. No. 5,533,149 and U.S. Pat. No. 5,563,963 describe an procedure for noise reduction using an overlapping planar approximation, in which the image code values are treated as a surface over the plane of the image. The method operates by placing around each image pixel nested neighborhoods of several sizes. In each of these neighborhoods a plane is fitted to the image codes using linear regression. The regression fit is used to compute an estimate of the central pixel along with a chi squared goodness of fit criterion. The output value of the pixel is the sum of the estimates for all the neighborhoods weighted by the goodness of fit criterion. The method is stated to smooth the image in relatively smooth areas without smoothing it in edge regions. Panda, D. P, and Kak, A. C., *IEEE Trans. Acoustics, Speech and Signal Proc.*, v25(6), 520–524 (1977) describe a related method for recursive least squares smoothing of noise in images. In the light of the existing literature it is surprising that a method as simple as the one of this invention is capable of beneficial results in smoothing noise and moiré patterns.

SUMMARY OF THE INVENTION

The present invention concerns a method for reduction of noise in images, including the reduction of fine-scale moiré patterns. Specifically the method involves treating the image intensity as a surface whose local shape is approximated by a local surface patch (a virtual area slicing adjacent elements of topography of moiré noise) centered on a pixel, which is used to estimate a modified intensity value for that pixel. More specifically the invention uses regression to estimate the best fit of the surface patch to the image intensity surface. Suitable surface patches can be described by a variety of mathematical surfaces, including planes and two-dimensional parabolas. This process is distinct from prior art methods in that it uses a single surface patch neighborhood around each pixel and uses the surface fit as an estimator of an improved pixel value rather than as a replacement for the surface in the neighborhood of the pixel.

DETAILED DESCRIPTION OF THE INVENTION

The practice of this invention operates on digital images. A digital image comprises a collection of picture elements or pixels arranged on a regular grid. A gray scale image is represented by a channel of specific brightness values at individual pixel locations. Such a channel may also be represented as a color palette, for example containing 256 shades of gray. Gray scale images contain only achromatic colors, in other words those colors without a specific hue and with a zero saturation. A color image contains several channels, usual three or four, to describe the color at a pixel. For example, there may be red, green and blue (RGB) channels, or cyan, magenta, yellow and black (CMYK) channels. Each channel again contains brightness values representing the amount of color at each pixel. A color image may also be represented in palettized form. Such images contain chromatic colors, which possess both hue and saturation. The invention is concerned with both monochromatic images and color images that suffer from the previously described phenomenon of moiré noise.

Figure 1:
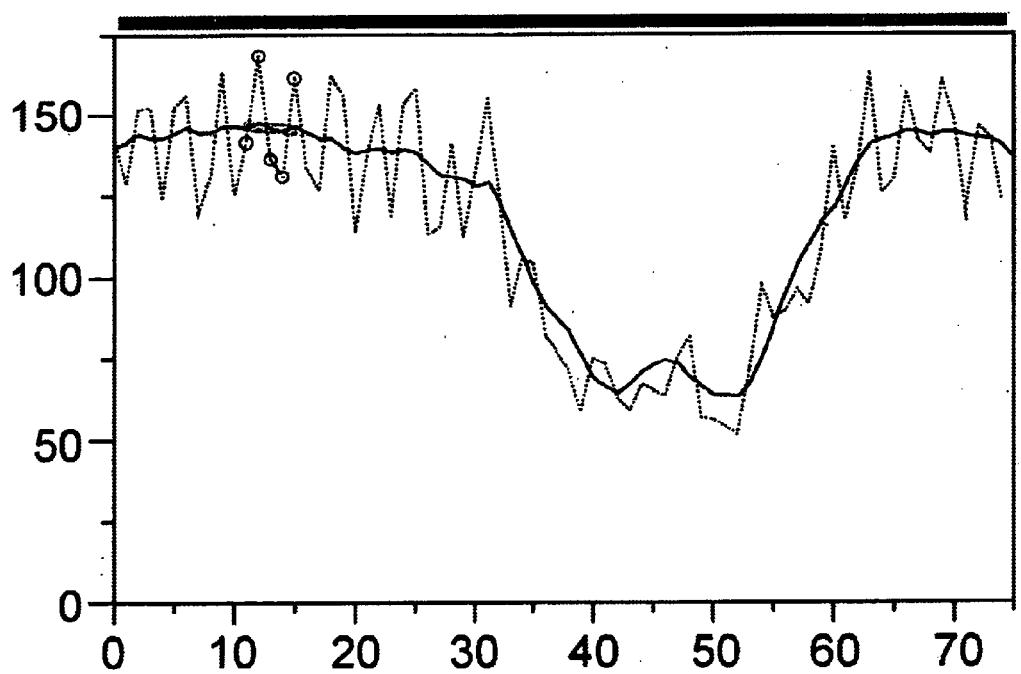
FIG. 1 show a single row of pixels from an image with moiré.
Figure 2:
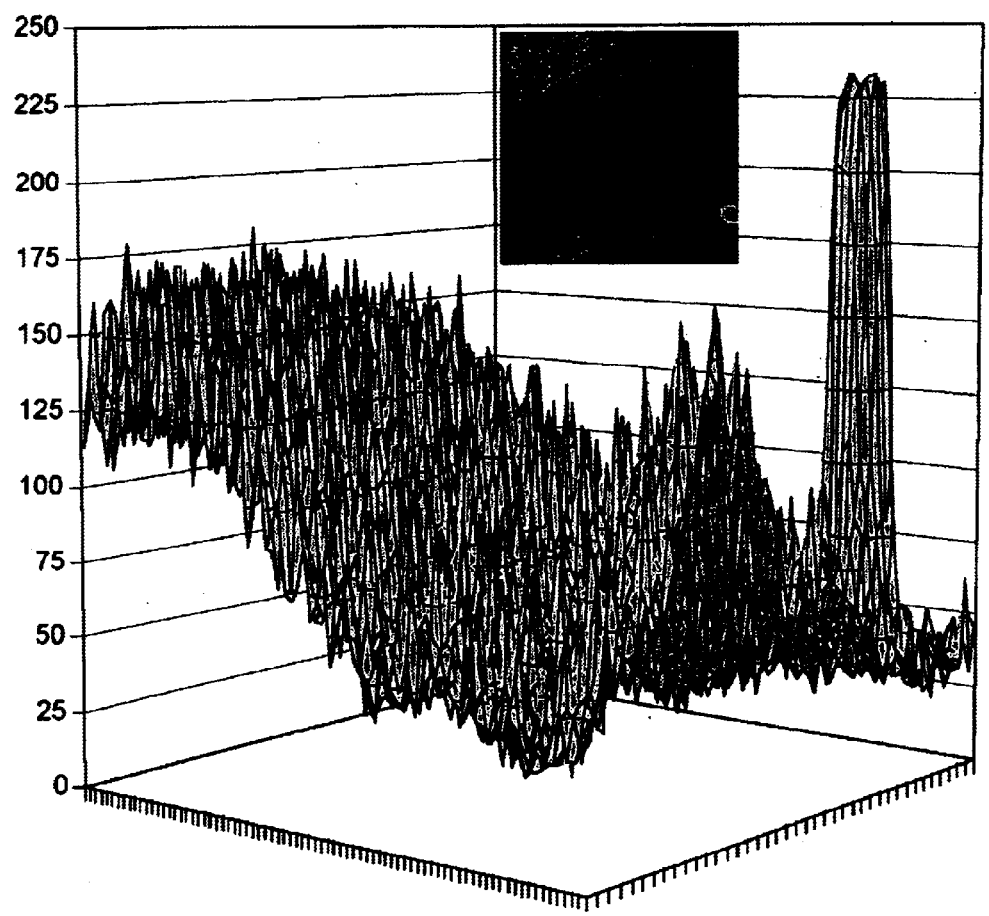
FIG. 2 depicts a section of a gray scale image with moiré patterns, with the gray channel values plotted as a surface over the plane of the image.

Moiré may be viewed as a form of noise or undesirable noise variations in three dimensional color space. Although moiré is formally the result of interaction of at least two spatial frequencies, in practice, moiré does not appear as a small contribution to the image data from a single moiré frequency. The general situation is more complex and lack of true periodicity increases the difficulty of removing moiré. Moiré can be considered as the superposition of noise on true image data. FIG. 1 show a single row of pixels from an image with moiré. The brightness variation along the row of pixels is shown as the dotted line on the chart below. The true image data are represented approximately by the solid lines This view of the image data is two-dimensional, one dimension representing the pixel position in the row and the second the brightness value at a that pixel position. For any color channel, the image can be considered as a three-dimensional object in which two dimensions are the image width (measured in columns) and height (measured in rows) and the third dimension comprises the color channel values. FIG. 2 depicts a section of a gray scale image with moiré patterns, shown as an insert, with the gray channel values plotted as a surface over the plane of the image. As an aid to orientation, the tall spike corresponds the brightest area of the image—the glint in the eye. The complex nature of the moiré pattern is readily apparent from the shape of the surface. The complexity of addressing moiré is that it varies from pixel to pixel and from region to region over the image, so it is difficult to provide a uniform correction over the entire image. The correction must also be local in order to adapt to and thus preserve authentic image features while suppressing moiré. Since moiré comprises high spatial frequency noise, its removal inevitably removes at least a small portion of authentic high frequency image information. It may, therefore, be desirable to sharpen a picture after moiré suppression, for example with a conventional convolution filter using a weighted window (e.g., a Laplacian filter). However, if the moiré itself is removed with a blurring convolution kernel (e.g., an averaging filter, a weighted averaging filter, a Gaussian blur filter, etc.) then the sharpening simply restores a part or all of the original moiré. This is because both sharpening and blurring filters work on the same principle, merely with a different weighting scheme in the filter window. Consequently, in order to permit sharpening it is highly desirable to remove moiré by means other than blurring with a convolution kernel and this is what the invention provides.

The invention achieves removal of noise, including moiré noise, by providing a three-dimensional representation of a image color or brightness channel as a surface over the plane of the image, creating a virtual surface patch, placing the surface patch against topography in the three-dimensional surface mapping of the image so that the virtual surface patch intersects topography of the three-dimensional surface with respect to at least some pixels of the image surface region, for example from about 5 to about 1000 pixels, adjusting the height, tilt and curvature of the surface patch with respect the image surface in order to optimally represent the surface, then estimating a palliative value for the image surface for at least one pixel within the area of the surface patch from the adjustment of the surface patch, and replacing the value of the at least one pixel in the image with the palliative value.

Figure 3:
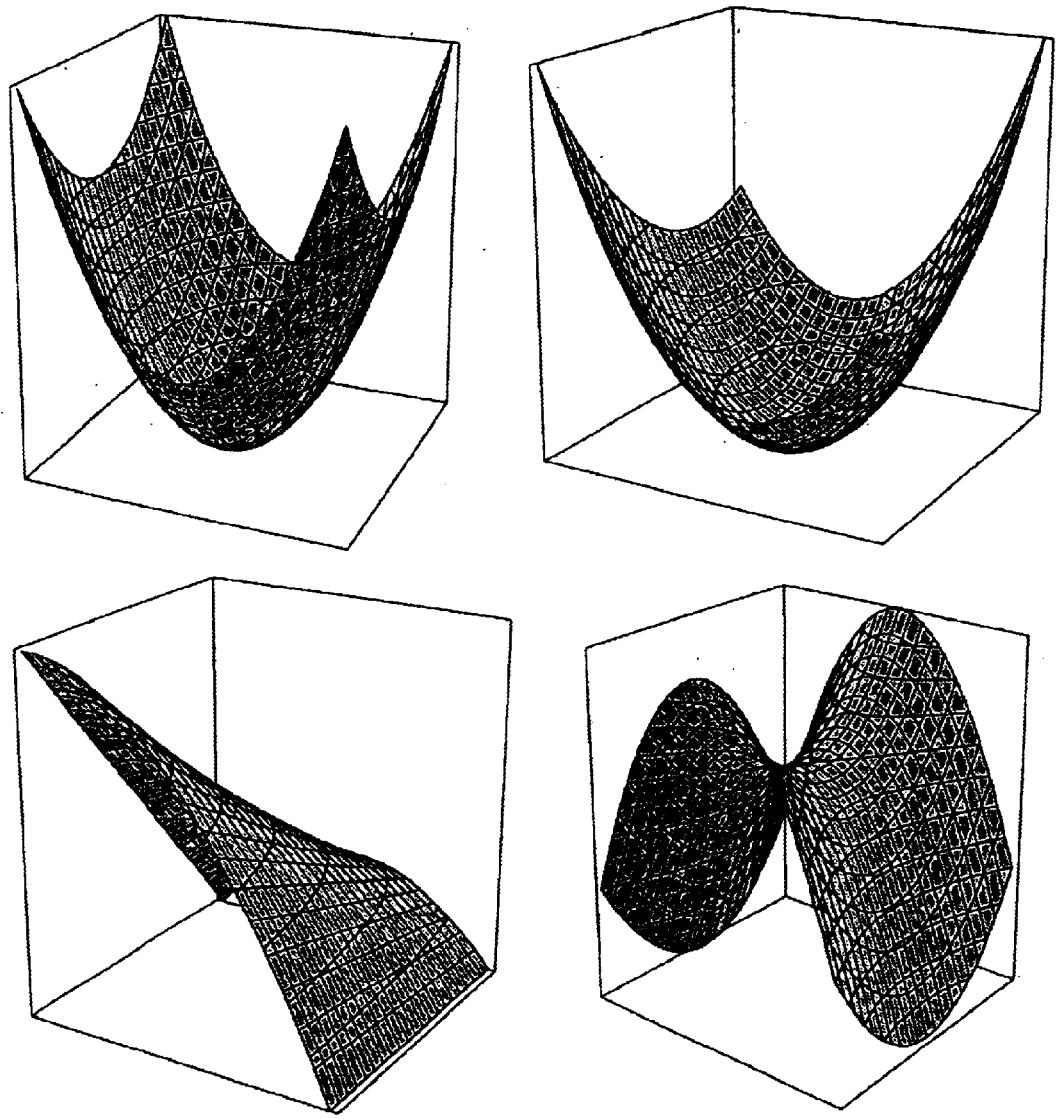
FIG. 3 shows examples of three-dimensional shapes that can be achieved with a surface described by two orthogonal parabolas.

The invention may best be understood by first considering a single row of pixels, since this reduces the problem from three dimensions to two. Referring to FIG. 1, which illustrates a row of pixels from an image with moiré, the gray (or brightness) values of the image are represented by the dotted line. Five of the values are circled to denote a region of brightness values. In this region, a palliative or improved value of the brightness will be estimated for the pixel marked with a shaded circle. A line or curve is fitted to the marked brightness values. In the case of a line, the tilt and height of the line is adjusted with respect to the brightness values. For a curve, such as a parabolic or spline curve, the height, tilt and curvature can be modified. For simplicity, FIG. 1 shows a line as a thick region of light gray. A procedure for optimizing the tilt and height of the line may be, for example regression analysis, which seeks to minimize the sum of the squared deviations of the image brightness curve with respect to the line. Once the position of the line has been optimized the resulting equation of the line may be solved, for instance at its midpoint (i.e. at the location of the pixel marked with a shaded circle) to yield a brightness value. This value can then be taken as an estimate of the true brightness of the image without moiré and used to replace the original image brightness value at this pixel. In the practice of this invention, the process just described is extended from the single dimension of an image row to two dimensions of the image area, namely both rows and columns, along with which the image brightness forms a three-dimensional system. The line then becomes a plane, with a height adjustment and two orthogonal tilt adjustments—one about an axis parallel to a row of image pixels and one about an axis parallel to a column of image pixels. A curve such as a parabola becomes a surface patch that is represented by parabolas in two orthogonal directions. Such a curve offers considerably more ability to conform to an image brightness surface. Some examples of the three-dimensional shapes that can be achieved with a surface described by two orthogonal parabolas are shown in FIG. 3. Still more complex surface topologies may be achieved, for example, with curves described by higher order polynomials (e.g., cubic) or trigonometric curves or piecewise curves (e.g., splines).

It is important to note that the practice of this invention does not involve the replacement of a region of the image brightness surface by a surface patch, which is a well-known method of approximating surfaces in the field of graphics. Instead, the patch is a virtual patch or mathematical construct whose purpose is to estimate a palliative value for at least one pixel in the region of the patch. Once this estimate is made, the patch is discarded and a new one is created centered, for example, on a pixel adjacent to the central pixel of the discarded patch, and this new patch is again fitted locally to the image brightness surface. In making such a fit, it is convenient to reuse intermediate computations from the previous fit in order to speed up calculations. However, the brightness representation of the image is never replaced with a series of contiguous surface patches. It is also important to note that, while there is some superficial similarity between the practice of this invention and image resampling, the processes are quite distinct. Resampling involves image interpolation with the aim, for instance, of changing the image size. Since new pixel positions are created, new brightness values must be computed at these positions from the original brightness values by a process of interpolation. However, the objective of such an interpolation is to reproduce the original pixel data as accurately as possible. Accordingly, if an image with a moiré pattern were resampled, the moiré pattern would still be present in the image, merely at a different size. The method of this invention seeks to perform a different task, that of representing an image faithfully enough to preserve image details, but not so faithfully as to preserve moiré. How to achieve this is by no means obvious.

Figure 4:
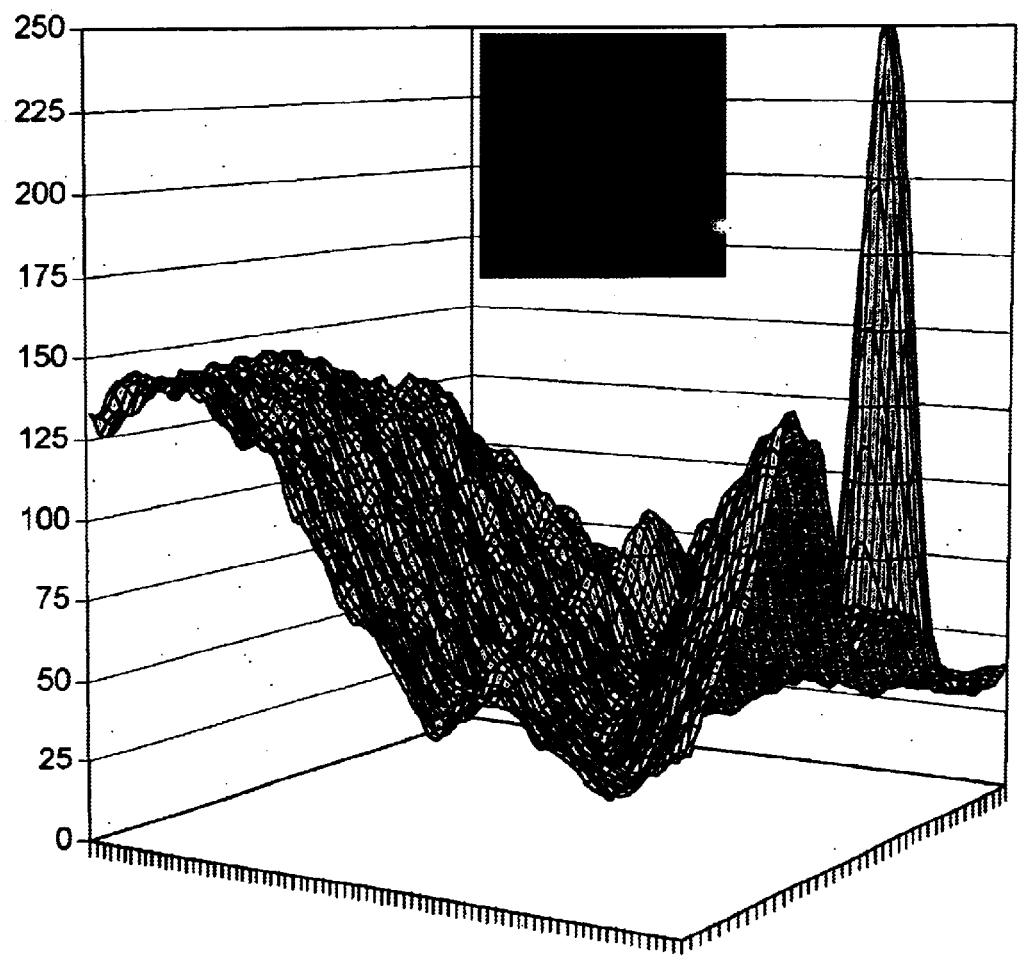
FIG. 4 shows the result image of treating the data of FIG. 2 using a virtual surface patch of 9 pixels by 9 pixels described by two orthogonal parabolas in accordance with the process of the invention.

The effectiveness of the method of this invention may be judged from the example original image with moiré shown in FIG. 2 along with its brightness surface. When this image is treated in accordance with the process of the invention using a virtual surface patch of 9 pixels by 9 pixels described by two orthogonal parabolas the result is as shown in FIG. 4. The moiré pattern is removed from the image and this is reflected in the smoother appearance of the brightness surface. However, subtle and small details in the image are maintained, such as for example the eyelashes. These are clearly visible as the small bumps in the central valley of the image brightness surface. Tests show that the picture is sharper than that obtained with a Gaussian blur filter while containing less moiré pattern. Sharpening of the image results in a very faint indication of moiré pattern, whereas the moiré is more pronounced after sharpening the image processed with the Gaussian blur filter.

The invention will further be illustrated with a description of certain specific embodiments. These serve as examples to explain the invention and not as limitations of its scope. Wide variation is possible within the scope of the invention, for example, with respect to the mathematical description of the virtual surface patch as indicated above. The size and shape of the patch may be varied depending on the type of image noise to be removed and the size of the image and the features within it. The patch may, for example be square, rectangular, circular, octagonal and the like. The edges of, for example, a square surface patch need not be aligned with the horizontal and vertical edges of the image. Particularly in the case of moiré noise, it may be advantageous to orient the patch at an angle to the image edges, for example at angles related to those used in printing line screens. Nor is it required to use minimization of squared deviations of the image surface from the surface patch for fitting the virtual surface patch to the image surface. For example, the minimization of mean unsigned deviation could be used. It is not necessary to process every image channel by the method of the invention. For example, a brightness channel could be treated with the virtual surface patch technique while chrominance channels are treated by other methods, for example, with an averaging filter. Since fine detail is primarily perceived in brightness rather than color, this approach gives good results and can reduce computational effort.

Let the image brightness or code value at a pixel be designated I(k,l), where k and l are respectively row and column coordinates of the pixel in the image. Further let a the brightness or code value of the fitted surface in a neighborhood around a pixel be designated R(k,l). As an example, let the fitting neighborhood of the pixel be a square window oriented parallel to the image edges and centered on pixel (k,l) of size 2n+1, where n is an integer greater than zero. The regression analysis or least squares fit seeks to minimize the quantity $\Sigma[I(i,j)-R(i,j)]^2$, where the sum, $\Sigma$, is performed over all pixels in the window i,j=1, . . . ,2n+1 and i and j denote the rows and columns respectively of the window. The fit is accomplished using methods well known to those skilled in the art. Example surfaces that may be fitted to image code values in the neighborhood around pixel (k,l) include the plane given by:

$$R(i,j)=A.i+B.j+C, \quad i,j=1, \ldots ,2n+1$$

and the two dimensional parabola given by:

$$R(i,j)=A.i^2+B.j^2+C.i.j+D.i+E.j+F, \quad i,j=1, \ldots ,2n+1$$

where A, B, C, D, E, F are constants to be determined by regression analysis and which minimize the sum specified previously. The new value of the central pixel is computed from the equation constructed from the constants determined by regression, which in the case of the example of a square window of size 2n+1 is R(k,l) at the window location (n+1,n+1). As the values of k and l are varied over the entire image or over some desired portion of it, the successive neighborhood fits give rise to a family of R(k,l) values, which form the code values of the output image. In the case of a greyscale image this is sufficient to generate an output image, any values which are not replaced by local fitting being taken directly from the original image. During movement of the fitting window over the image, it is especially desirable to retain intermediate calculation results from the region of overlap of the current window and the previous window in order to maximize computational speed.

In a color image, at least three components are required to describe the color, for example red, green and blue or hue angle, saturation and lightness, though it is possible to use more colors, such as cyan, magenta, yellow and black. In general, pixel colors can be represented in one of many color spaces, which can be transformed one to the other. However, it is typical to transform the final image color representation to red, green and blue for display on a monitor or to cyan, magenta, yellow and black for printing. For the practice of this invention it is advantageous to convert the image to a color space that is an opponent color space prior to applying the window filter. Such a color space has two color axes that approximately correspond to human color vision. Thus, one axis represents approximately colors ranging from yellow to blue and a second axis colors ranging from red to green. The remaining third axis is a measure of the brightness of the color. Such color axes are termed opponent since humans cannot see colors such as yellowish-blue, bluish-yellow, reddish-green or greenish-red. It will be understood by those skilled in the art that there are many color spaces with an approximately opponent property. For the practice of this invention it is sufficient that the color space has only an approximately opponent character and not an exact match to the characteristics of human vision. Examples of such color spaces include YUV, YIQ, YCC, YCbCr and YES. It is also possible to define suitable color spaces by simple arithmetic manipulation of the red (R), green (G) and blue (B) color channels. Thus, a first color axis can be defined as R−G, a second color axis as 0.5(R+G)−B, and a third as 0.33(R+G+B). Particularly preferred for the practice of the invention are opponent color spaces providing a good match to human perception such as CIE L*u*v* or CIE L*a*b*. Most especially preferred is CIE L*a*b*. While it is possible to smooth all three channels by the fitting procedure of the invention, it has be found useful to smooth only the lightness channel in this way and to smooth the color channels by other methods, such as simple averaging. This can be done because the human eye sees high spatial frequency detail primarily in lightness so that averaging of the color channels does not lead to visual loss of detail. The averaging procedure can advantageously improve the speed of the overall noise reduction process without deleterious effect on image detail.

While the invention has been illustrated with reference to a square window parallel to the edges of the image, it is understood that the window may be of other shapes and orientations. For example, the window may be circular or cross-shaped or X-shaped. Additionally, the window may be, for instance, square or cross-shaped but oriented at an angle to the image edges. In this way the window can be oriented with the dominant direction of moiré structure in the image. The degree of noise suppression is a function of window size, and increases as the window is made larger. However, as the window size increases so does the suppression of desirable image detail. There is thus an optimal value of window size, which depends on image content. For a wide variety of images a value of n of about 2 has been found most effective. Both planar and parabolic fits have been found effective, though in many cases the parabolic fit leads to better preservation of image detail. Other mathematical forms for the surface patch are, however, not excluded.

Additionally it has been found that images smoothed by the method of this invention can subsequently be sharpened by a sharpening filter kernel, with a stronger effect on image edges regions than on image noise. In many cases of moiré the image can be significantly sharpened without restoration of the moiré pattern.

What is claimed is:

1. A method of noise removal from a digital image comprising providing a three-dimensional surface mapping representation of a at least one image color channel as a surface over a plane of the image, creating a virtual surface patch, placing the surface patch against topography in the three-dimensional surface mapping of the image so that the virtual surface patch intersects topography of the three-dimensional surface with respect to at least some pixels of an image surface region, adjusting height, tilt and curvature of the virtual surface patch with respect to the image surface to fit the surface, then estimating a palliative value for the image surface fitted with the virtual surface patch for at least one pixel within the area of the surface patch from the adjustment of the surface patch, and replacing the value of the at least one pixel in the at least one image color channel with the palliative value.

2. The method of claim 1 wherein the fit of the surface comprises an attempt to approximately represent the image surface.

3. The method of claim 1 wherein the virtual surface patch fitted on the pixel brightness values comprises a plane.

4. The method of claim 1 wherein the virtual surface patch fitted on the pixel brightness value is described by two orthogonal parabolas.

5. The method of claim 1 wherein the virtual surface patch contains from to 9 to 170 pixels.

6. The method of claim 1 wherein the image noise is moiré pattern noise.

7. The method of claim 6 wherein the adjustment of the height, tilt and curvature of the surface patch with respect the image surface in order to optimally represent the surface is accomplished by means of regression analysis to minimize the sums of the squared deviations between the virtual surface patch and the image brightness surface.

8. The method of claim 7 wherein the virtual surface patch is fitted on pixel color channel values and comprises a plane.

9. The method of claim 7 wherein the virtual surface patch is fitted on pixel color channel values and is described by two orthogonal parabolas.

10. The method of claim 6 wherein the virtual surface patch is fitted on pixel color channel values and comprises a plane.

11. The method of claim 6 wherein the virtual surface patch is fitted on pixel color channel values and the virtual surface patch is described by two orthogonal parabolas.

12. The method of claim 1 wherein the adjustment of the height, tilt and curvature of the surface patch with respect the image surface in order to optimally represent the surface is accomplished by means of regression analysis to minimize the sums of the squared deviations between the virtual surface patch values and the image color channel surface values.

13. The method of claim 12 wherein the virtual surface patch fitted on pixel color channel values and comprises a plane.

14. The method of claim 12 wherein the virtual surface patch is fitted on pixel color channel values and is described by two orthogonal parabolas.

15. The method of claim 1 where the at least one color channel is a brightness channel approximating the human perception of brightness.

16. The method of claim 15 wherein the adjustment of the height, tilt and curvature of the surface patch with respect the image surface is performed to optimally represent the surface is accomplished by means of regression analysis to minimize the sums of the squared deviations between the virtual surface patch and the three-dimensional surface mapping representation of an image brightness surface.

17. The method of claim 16 wherein the virtual surface patch is fitted on pixel brightness values and comprises a plane.

18. The method of claim 16 wherein the virtual surface patch is fitted on pixel brightness value and is described by two orthogonal parabolas.

* * * * *